UNITED STATES PATENT OFFICE.

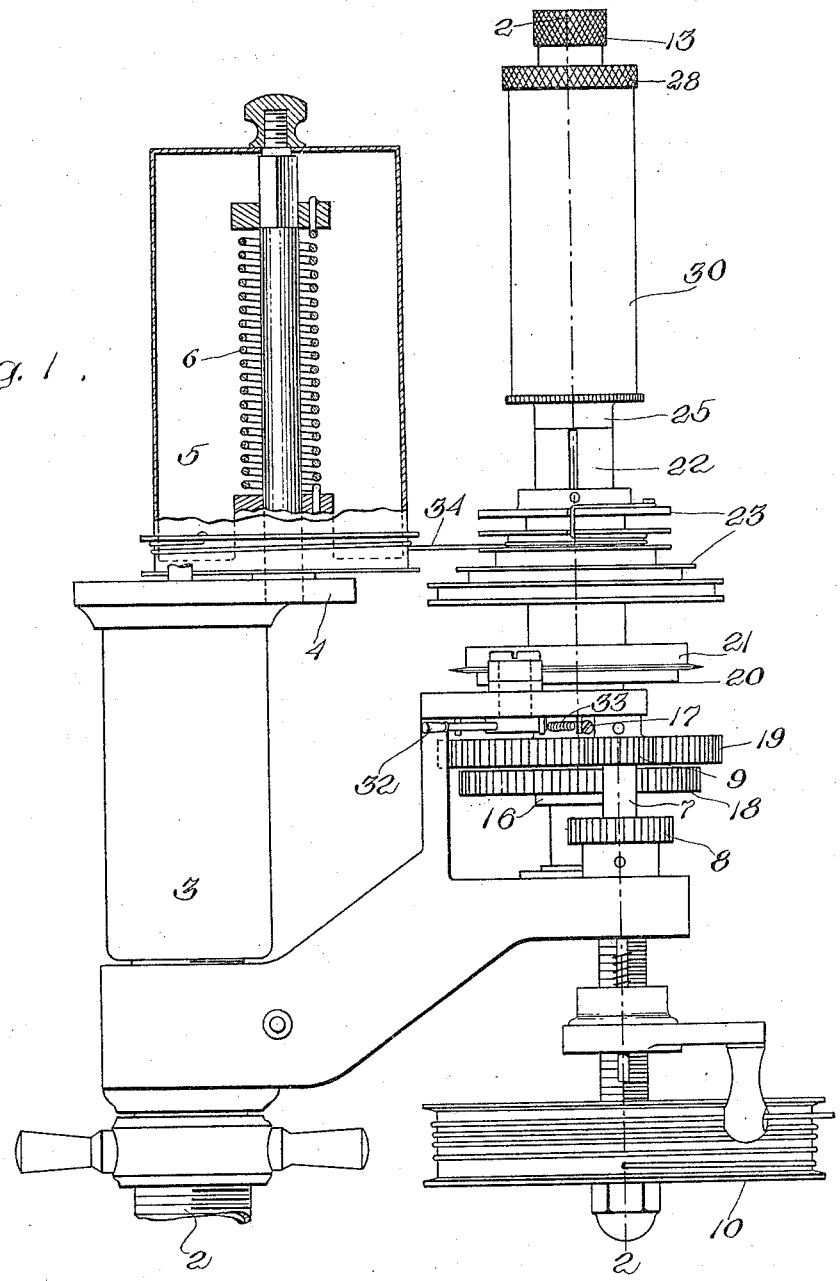

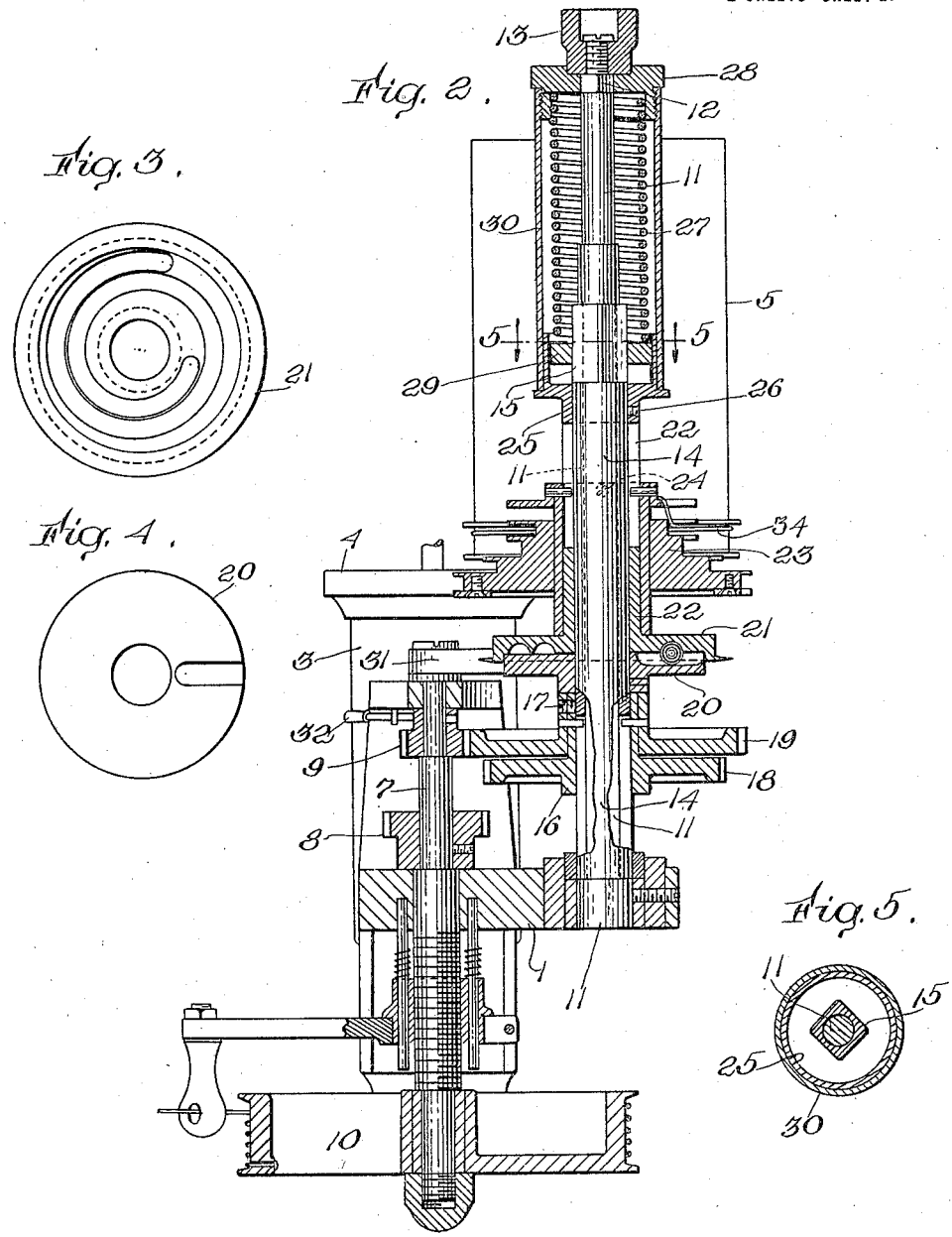

ADELBERT O. BENECKE, OF BOSTON, MASSACHUSETTS, ASSIGNOR TO CROSBY STEAM GAGE & VALVE COMPANY, OF BOSTON, MASSACHUSETTS, A CORPORATION.

REDUCING-WHEEL.

1,182,132.   Specification of Letters Patent.   Patented May 9, 1916.

Application filed May 23, 1914. Serial No. 840,505.

*To all whom it may concern:*

Be it known that I, ADELBERT O. BENECKE, a citizen of the United States, and a resident of Boston, in the county of Suffolk and State of Massachusetts, have invented certain new and useful Improvements in Reducing-Wheels, of which the following is a specification.

This invention relates to reducing wheels for engine indicators and its object is to provide a simple, compact and durable reducing wheel adapted for use on engines of any length of stroke.

While the reducing wheels now in use operate satisfactorily, when employed on short-stroke engines, it is found, when using them on a long-stroke engine, that the controlling spring, common to all reducing wheels, either breaks or becomes permanently distorted and useless. There are two reasons for this: First: the lengths of strokes of different engines vary to such an extent, from about 10 to 72 inches, that it is impossible to adapt a reducing wheel for the different strokes by simply changing the ratio between the diameters of the pulleys, the only method now in use without overstraining the controlling spring. Second: the ends of the controlling springs of all reducing wheels are fastened to longitudinally fixed abutments, no provision being made to accommodate the increased or decreased number of convolutions of the spring caused by its winding up, or unwinding.

To avoid these defects is the object of my invention and I attain this object by the mechanism of which the following is a description.

The invention is illustrated by the accompanying drawings, in which:—

Figure 1 is an elevation of the device; Fig. 2 is a vertical, sectional view on the line 2—2 Fig. 1; Figs. 3 and 4 are detailed views of the clutch members; and Fig. 5 is a sectional view on the line 5—5 Fig. 2.

The reducing mechanism is mounted on the frame 1 clamped to the bushing 2, on which bushing is mounted the steam cylinder 3 furnished with the arm 4, whereon is mounted the rotary reciprocating paper drum 5 furnished with the controlling spring 6. The shaft 7, journaled in frame 1, is furnished intermediate its bearings with the gears 8 and 9, while to its lower end is fixed the stroke pulley 10. The cylindrical, vertical shaft 11, fixedly mounted on frame 1, is furnished adjacent its upper end with the exteriorly squared portion 12 and has its upper end threaded to receive the thumb nut 13. The sleeve 14, rotatably mounted on shaft 11, terminates at its upper end in the exteriorly squared portion 15; the sleeve 16, splined to sleeve 14 and held in longitudinal adjustment thereon by set screw 17, carries the gears 18 and 19 adapted to engage, respectively, gears 8 and 9. The driving clutch member 20 is fixed to said sleeve 14, so as to rotate therewith; while the driven clutch member 21 is fixed to the sleeve 22, which is rotatably mounted on said sleeve 14 and carries the stepped pulley 23 splined thereto and held in longitudinal adjustment thereon by set screw 24. Longitudinal movement of sleeve 22 on sleeve 14 is prevented by the collar 25 surmounting said sleeve 22 and secured to sleeve 14 by set screw 26; said collar 25 being interiorly enlarged at its upper end and exteriorly flanged. The controlling spring 27 has its upper end fixed to the exteriorly threaded and interiorly squared collar 28 adapted to fit over and engage the squared portion 12 of shaft 11 and its lower end fixed to the interiorly squared collar 29 adapted to fit loosely over and travel along the squared portion 15 of sleeve 14, as said sleeve rotates. The tubular member 30 rests upon the flanged portion of collar 25, thereby forming a spring chamber and is threaded at its upper end to engage collar 28, which is held on shaft 11 by the thumb nut 13. The friction pawl 31, adapted to engage driven member 21 of the clutch, is operated by the handle 32 and held in its extreme positions by the spring 33. The cord 34 connects the stepped pulley 23 with the paper drum 5. By this arrangement of the several parts of the device as described provision is made for—First: raising and lowering the stepped pulley in order to bring any particular pulley into proper alinement. Second: throwing either set of gears 8 and 18, or 9 and 19, into engagement, thereby varying the speed of the stepped pulley relatively to that of the stroke pulley. Third: automatically lengthening, or shortening, the controlling spring 27, as the number of convolutions thereof increases, or decreases. The gears are of such diameters, that the motion of the shaft 7 is transmitted to the sleeve 14 at a different ratio, when gears 8 and 18, or gears 9 and 19, are engaged respectively. Preferably I make the ratio 1 to 2.5 between gears 8 and 18 and 1 to 5 between gears 9 and 19; so that, when gears 8 and 18 are engaged, the sleeve 14 will make one revolution for every two and a half revolutions of the stroke pulley 10 and when gears 9 and 19 are engaged, the sleeve 14 will make one revolution for every five revolutions of said stroke pulley.

As the clutch mechanism and the indicating mechanism (including reciprocating drum 5) form no part of the present invention, they need not be more fully illustrated, or described; though it should be noted that the controlling springs 27 and 6 are each provided with the means for automatic longitudinal adjustment, which provision constitutes a very important part of this invention.

I claim:

1. A reducing wheel of the character described comprising, in combination, a fixed shaft, a rotatably reciprocating sleeve mounted thereon and reducing mechanism for reciprocating said sleeve including a controlling spring having one end fixed to said shaft and the other end engaging said said sleeve rotatably therewith and automatically adjustably therealong.

2. A reducing wheel of the character described comprising, in combination, a fixed shaft, a rotatably reciprocating sleeve mounted thereon and reducing mechanism for reciprocating said sleeve including a controlling spring and sets of coacting gears, with means for bringing any desired set of gears into engagement and disengaging the remaining gears.

3. A reducing wheel of the character described comprising, in combination, a fixed shaft, a rotatably reciprocating sleeve mounted on said shaft, reducing mechanism including a controlling spring for reciprocating said sleeve and a stepped pulley mounted on said sleeve rotatably therewith and adjustably therealong.

4. A reducing wheel of the character described comprising, in combination, a fixed shaft, a rotatably reciprocating sleeve mounted on said shaft, a stepped pulley mounted on said sleeve rotatably therewith and adjustably therealong and reducing mechanism for reciprocating said sleeve including a controlling spring and sets of coacting gears, with means for bringing any desired set of gears into engagement and disengaging the remaining gears.

5. A rotatably reciprocating spring comprising, in combination, a shaft, a collar mounted thereon rotatably therewith and automatically movably therealong and a spring having one end fixed to said shaft and the other end fixed to said collar.

In testimony whereof I have affixed my signature, in presence of two witnesses.

ADELBERT O. BENECKE.

Witnesses:
RALPH W. FOSTER,
CLARENCE L. NEWTON.